United States Patent [19]

Bunger

[11] 4,346,670

[45] Aug. 31, 1982

[54] PREFABRICATED MOLD INSERTS FOR FORMING FLUME PLATFORMS FOR ANIMAL CONFINEMENT PENS AND METHOD OF CONSTRUCTION

[76] Inventor: Richard E. Bunger, 5202 E. Washington St., Phoenix, Ariz. 85034

[21] Appl. No.: 239,397

[22] Filed: Mar. 2, 1981

Related U.S. Application Data

[62] Division of Ser. No. 99,913, Dec. 3, 1979.

[51] Int. Cl.³ .............................................. A01K 1/00
[52] U.S. Cl. ...................................................... 119/28
[58] Field of Search ................................... 119/16, 28

[56] References Cited

U.S. PATENT DOCUMENTS

| | | | |
|---|---|---|---|
| 428,848 | 5/1890 | Logan | 119/28 |
| 458,788 | 9/1891 | Jungbluth | 119/28 |
| 469,044 | 2/1892 | Jungbluth | 119/28 |
| 1,437,297 | 11/1922 | Engert | 249/22 |
| 3,020,618 | 2/1962 | Eward | 25/154 |
| 3,166,816 | 9/1963 | Berg | 25/128 |
| 3,224,414 | 12/1965 | Conover | 119/28 |
| 3,228,376 | 1/1966 | Conover | 119/28 |
| 3,796,054 | 3/1974 | Piccagli | 61/35 |
| 3,848,034 | 6/1972 | Schaeffer | 264/30 |
| 3,859,962 | 1/1975 | Kissinger, Jr. | 119/28 |
| 3,982,499 | 9/1976 | Frankl | 119/16 |
| 4,048,960 | 9/1977 | Barnidge | 119/28 |

Primary Examiner—Hugh R. Chamblee
Attorney, Agent, or Firm—Warren F. B. Lindsley

[57] ABSTRACT

A mold insert forming a passageway for use in forming a flumed concrete slab for animal confinement pens and buildings which is partially torn away after setting of the concrete slab around it to form a partial lining for the flume or flumes.

4 Claims, 26 Drawing Figures

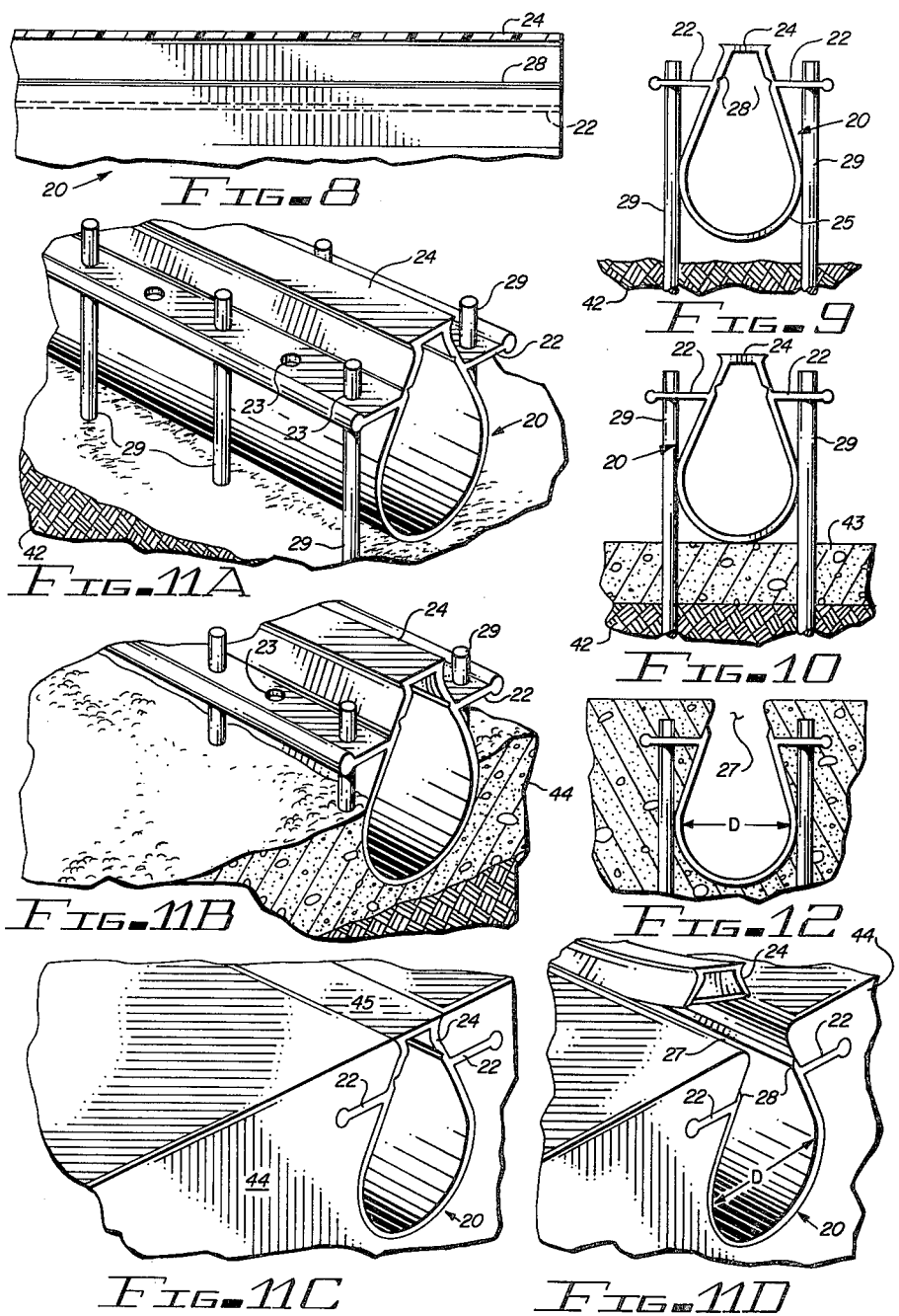

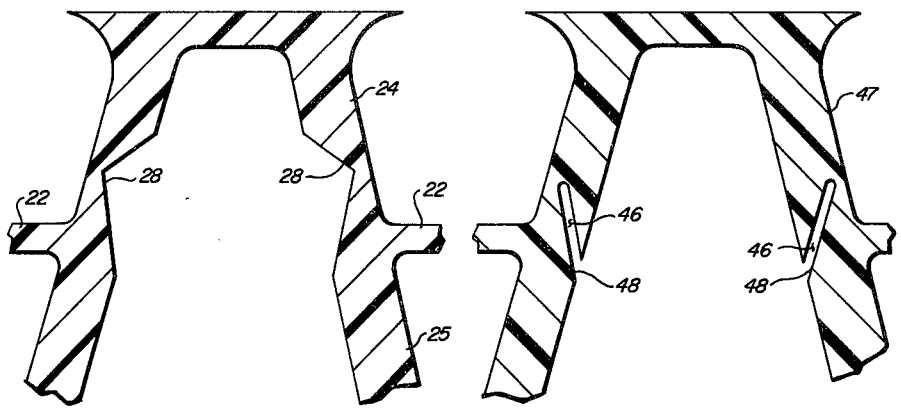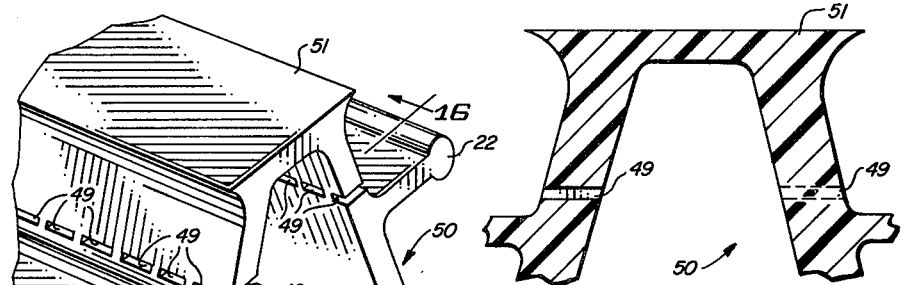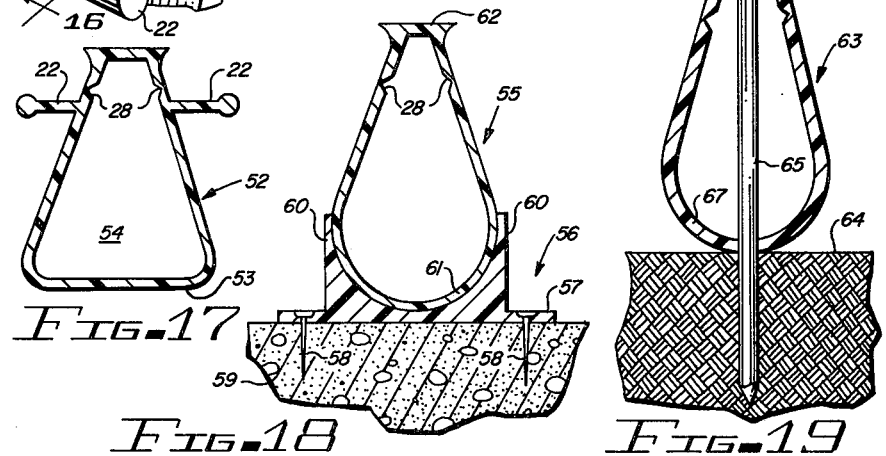

PREFABRICATED MOLD INSERTS FOR FORMING FLUME PLATFORMS FOR ANIMAL CONFINEMENT PENS AND METHOD OF CONSTRUCTION

BACKGROUND OF THE INVENTION

This application is a division of application Ser. No. 99,913, filed Dec. 3, 1979 and entitled PREFABRICATED MOLD INSERTS FOR FORMING FLUME PLATFORMS FOR ANIMAL CONFINEMENT PENS AND METHOD OF CONSTRUCTION.

In recent years, there has been a trend toward the converting of animals to marketable conditions.

With land becoming increasingly more expensive, the use of conventional feedlots near large cities is becoming unacceptable. Pollution regulations are stricter and more rigidly enforced. Additionally, weather conditions in many portions of the world are not conducive to confinement feeding in open feedlots.

Accordingly, confinement buildings are becoming more acceptable for animal conversion but with them go hand in hand the handling problems of animal excretion. Manure handling is a gigantic problem in open feedlots as well as confinement buildings but if handled properly it can be economically disposed of.

Although flumed platforms for confinement pens of several hundred feet and more in length have been extruded by slipform pavers, this equipment is not usable for relatively small platforms of a hundred feet or less. Accordingly, the smaller flumed platforms must be formed utilizing some form of prefabricated flume configuration which either remains in the platform or is removed after the concrete has firmed up.

Since it is practical and desirable to utilize a lined flume configuration for the handling of animal excreta, a need exists for a prefabricated insert molded into the animal confinement pen platform during its construction which will serve the purpose of a mold insert and then be altered to serve its ultimate purpose of a flume lining.

DESCRIPTION OF THE PRIOR ART

U.S. Pat. No. 458,788 discloses a flooring for stables employing drain channels of tapering section which are slotted at the top in a longitudinal direction.

U.S. Pat. No. 469,044 discloses a pavement for stables employing slats running longitudinally thereof having drain pipes of a slotted configuration placed and formed therein.

U.S. Pat. No. 3,228,376 discloses a slotted floor forming flumes in an animal enclosure.

U.S. Pat. No. 3,224,414 discloses a flooring for a feeding structure having an annular trench formed therein.

U.S. Pat. No. 3,859,962 discloses a flushable floor for cattle confinement feedlots wherein the floor includes a plurality of inclined surfaces sloping downwardly to floor slots connecting to sub-floor collector tubes or channels.

U.S. Pat. No. 3,982,499 discloses a system for converting the excreta of animals into dry and liquid food supplements. The floor panel disclosed flumes which form a part of the concrete platform on which the animal confinement pen is mounted.

U.S. Pat. No. 4,048,960 discloses a slotted surface flooring for use in animal husbandry comprising a number of extruded aluminum floor lengths each having a slotted top surface with longitudinal and transversely spaced apart slots.

SUMMARY OF THE INVENTION

It is, therefore, one object of this invention to provide an improved insert for molding flumes in platforms for animal feedlots and confinement buildings which flumes handle and move the animal excreta.

Another object of this invention is to provide an improved dual purpose mold and flume lining for ground supported platforms for feedlots and animal confinement buildings.

A further object of this invention is to provide an improved mold and flume lining for the platform of feedlots and animal confinement buildings which after serving as a mold during the concrete pouring and aging stage is easily modified to serve as the flume lining.

A still further object of this invention is to provide an improved mold insert for forming flumes in concrete animal confinement platforms which mold insert employs anchor flanges extending laterally therefrom for firmly encasing the mold insert in the concrete forming the platform.

A still further object of this invention is to provide a mold insert for forming flumes in concrete animal supporting platforms which is easily modified to cause the mold insert to form a lining for the flumes after serving its function as a mold insert.

A still further object of this invention is to provide a prefabricated plastic tear-away mold insert which forms a hollow closed configuration when functioning as a mold and when modified by tearing or cutting off the top portion thereof forms a teardrop shaped lining for the flumes formed by the mold insert in a concrete slab.

A still further object of this invention is to provide an improved prefabricated flume containing panel which may be positioned in a feedlot or confinement building adjacent the feed trough for supporting the animals during feeding and collecting and transporting their excreta released at that time by means of a liquid carrier to one end thereof.

A still further object of this invention is to provide an improved platform for feedlots and animal confinement buildings in which spacedly positioned lined flumes in the platform are conformed to provide narrow openings at the animal supporting surface of the platform for animal comfort and a wider cross-sectional configuration at the base of the flumes to aid excreta movement by a liquid carrier.

A still further object of this invention is to provide an improved ground supported platform containing integral, spacedly positioned plastic lined and anchored flumes with platform surfaces between the flumes slightly arched to aid by animal hoof movement their excreta into the flumes, rain run off, and to prevent or minimize puddling and dampness in the feedlot or confinement buildings.

A still further object of this invention is to provide a new and improved method for forming concrete slabs having at least one flume therein which is lined in a given manner along its length.

Further objects and advantages of the invention will become apparent as the following description proceeds and the features of novelty which characterize this invention will be pointed out with particularly in the claims annexed to and forming a part of this specification.

BRIEF DESCRIPTION OF THE DRAWING

The present invention may be more readily described by reference to the accompanying drawing in which:

FIG. 8 is a cross-sectional view of FIG. 2 taken along the line 8—8;

FIG. 9 is an end view of the structure shown in FIG. 1 with the holding stakes in position over ground ready for a concrete slab to be poured around and under the mold insert and flume lining structure;

FIG. 10 is an end view of the mold insert shown in FIG. 9 staked in position over an already existing concrete slab;

FIG. 11A is a partial perspective view of the mold insert staked in position over the ground ready for concrete to be poured around and under it;

FIG. 11B is a partial perspective view of the concrete poured around and partially surrounding the mold insert;

FIG. 11C is a partial perspective view of the mold insert shown in FIGS. 11A and 11B surrounded by concrete except for its top surface;

FIG. 11D is a partial perspective view illustrating the manner in which the top portion of the mold insert is torn away leaving the remainder of the insert in place to form a lining for the flume formed by the mold insert.

FIG. 12 is an end view of the torn away mold insert in place in a concrete slab;

FIG. 13 is an enlarged partial cross-section view of the mold insert illustrating the weakened sections of the mold insert which makes it possible to easily sever the top of the mold insert from the reaminder thereof;

FIG. 14 is an enlarged partial cross-sectional view of a modification of the mold insert shown in FIG. 13 illustrating a slotted configuration forming the weakened tear-away section of the mold insert;

FIG. 15 is a partial perspective view of a further modification of the mold insert shown in FIGS. 1–14 employing spacedly aligned slots forming the tear-away section of the mold insert;

FIG. 16 is a cross-sectional view of FIG. 15 taken along the line 16—16;

FIG. 17 is an end view of a further modification of the mold insert shown in FIGS. 1–16;

FIG. 18 is an end view of a further modification of the mold inserts shown in FIGS. 1–17 wherein the insert is formed to rest in a bracket which clamps and holds the insert in position for receiving concrete therearound;

FIG. 19 is an end view of a further modification of the mold inserts shown in FIGS. 1–18 wherein the insert is held in place by a stake extending vertically therethrough.

DESCRIPTION OF THE PREFERRED EMBODIMENT

Figure 1:
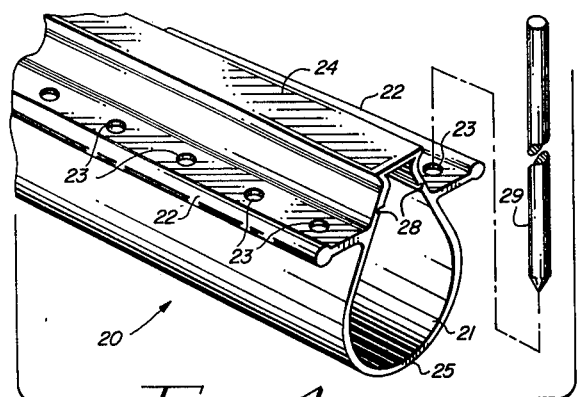
FIG. 1 is a partial perspective exploded view of a mold insert for forming flumes in concrete slabs or platforms for animal confining feedlots and buildings and embodying the invention.

Referring more particularly to the drawing by characters of reference, FIG. 1 discloses a partial perspective view of a mold insert 20 for use in forming a concrete floor supporting panel for animal feedlots and confinement buildings. This panel is provided with one or more flumes spacedly arranged to extend longitudinally thereof and terminating at each end thereof. The flumes are formed by mold inserts 20 around which the panel is formed.

Although the panels may be of any length, the mold inserts are designed for use in forming flumed concrete slabs of a size too small to be formed by slipform pavers. When positioned on the ground to form a platform, like ends of the panels are suitably elevated a predetermined amount to cause liquid flowing through the flumes to move under gravity toward their other ends.

Figure 2:
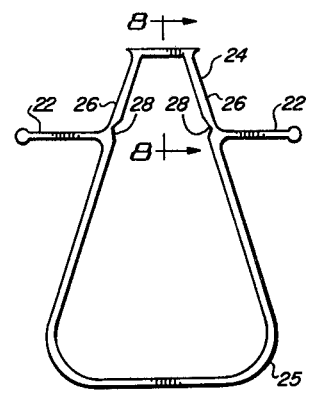
FIG. 2 is an enlarged right end view of FIG. 1.

As shown in FIG. 1, the mold insert 20 formed of a suitable resilient material, such as plastic, comprises an elongated configuration of any suitable length having a hollow interior 21 intended to form a passageway when molded in a concrete slab for liquid moving excreta therealong. The hollow interior may have an arcuate configuration one form of which is of a teardrop shape. As shown in FIGS. 1 and 2, the mold insert is provided with a pair of arms or flanges 22 extending laterally of the outer periphery thereof along its length which flanges are provided with a plurality of spacedly arranged apertures 23 extending therethrough.

The mold insert 20 is closed at the neck of the teardrop configuration by a tear-away cap or top 24. The cap or top 24 is separable from the remainder 25 of the mold insert at a weakened or tear-away zone, line or area 26.

It should be noted that the top 24 of the mold insert when torn away from the remainder 25, as shown in FIGS. 10 and 11D, leaves an opening into the mold insert cavity having a neck or opening 27 which is considerably smaller than the diameter or width D of the arcuate configuration forming the elongated hollow interior of the insert cavity. The tear-away zone, line or area 26 may be formed by a slotted configuration 28 formed adjacent to and immediately above the flanges 22 and extending along the length of mold insert 20 so that when the resilient cap 24 is removed the flanges will hold the remainder 25 of the insert firmly in place in the concrete, as shown in FIGS. 11 and 12. Also, it should be noted that the tear-away line in all of the embodiments shown is at a wider area of the neck of the teardrop than its opening 27. This feature is intended to keep the excreta from running over the breakaway edge of the insert and loosening it from the concrete in which the insert is embedded.

Figure 6:
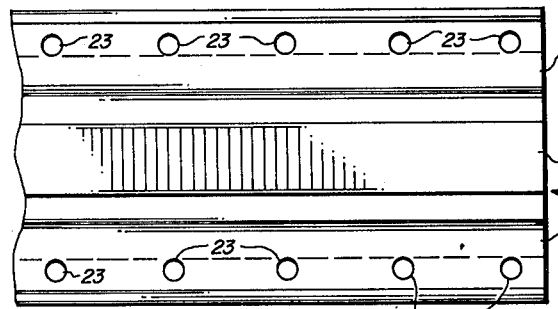
FIG. 6 is a top plan view of FIG. 1.

FIGS. 1, 2 and 6 illustrate that the mold insert is held in place prior to the pouring of concrete therearound by a plurality of stakes 29 which are positioned in some or all of the apertures 23 along the length of the mold insert and driven into the ground in the manner shown in FIGS. 9, 10, 11A and 11B.

Figure 3:
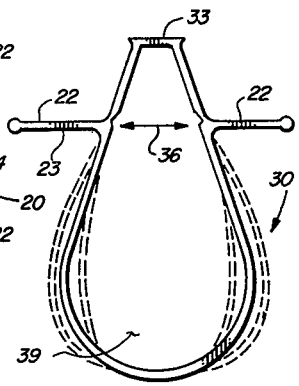
FIGS. 3, 4 and 5 are cross-sectional views of modifications of the mold insert shown in FIGS. 1 and 2.
Figure 7:
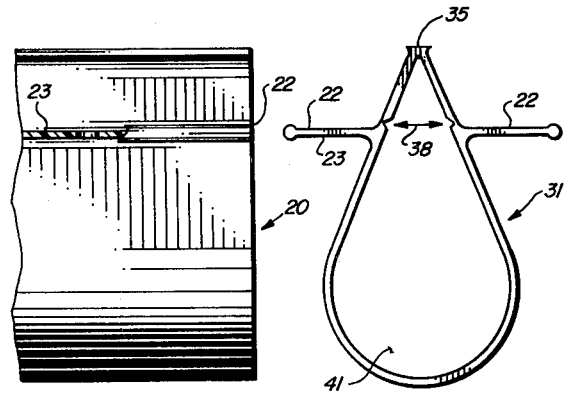
FIG. 7 is a partly broken away side view of FIG. 1.
Figure 5:
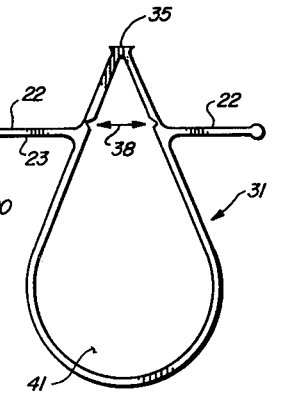
Figure 4:
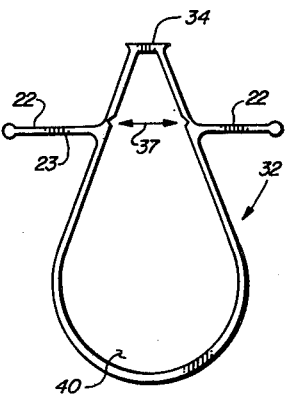

FIGS. 3, 4 and 5 illustrate mold inserts 30, 31 and 32 having flanges with apertures spacedly positioned along their lengths extending laterally therefrom in the same manner as the flanges shown in FIGS. 1, 2 and 6 and given the same reference characters. These mold inserts differ from each other and mold insert 20 in their geometrical configuration. Particular attention is directed to their caps 33, 34 and 35, respectively, which result in different width slot openings 36, 37 and 38 leading into their cavities 39, 40 and 41.

FIGS. 9 and 10 illustrated that the mold insert may be staked in position above the ground 42 a given distance so that concrete may be poured under it as shown in FIG. 11B or on top of an already existing concrete slab 43 as shown in FIG. 10.

FIGS. 11A, 11B, 11C and 11D illustrate the steps in forming one or more flumes in a concrete slab using the novel mold inserts disclosed herein.

FIG. 11A illustrates the mold insert 20 staked to the ground in the manner shown in FIG. 9 wherein the stakes may be supporting the flanges 22 at a given position along their lengths merely by friction, some form of protrusion on the stakes at that point or by some form of glue or cement material. Concrete 44 is then poured around it as shown in FIG. 11B until it surrounds it except for the top surface 45 of top 24. The concrete is then finished into the flat top slab shown and allowed to age. After a predetermined time, the top 24 is pulled away from the bottom portion 25 of the mold insert in the manner shown in FIG. 11D at the breakaway line or zone formed by the slotted configuration 28.

FIG. 13 is an enlargement of a portion of the mold insert 20 illustrating the breakaway zone or line formed by the slotted configuration 28.

FIG. 14 illustrates a modification of the slotted configuration shown in FIG. 13 wherein slot 46 extending along the length of the mold insert weakens the walls of the mold insert 47 to form a breakaway zone 48.

FIGS. 15 and 16 illustrate a further modification of the slotted configuration shown in FIGS. 13 and 14 wherein the breakaway zone is formed by a plurality of spaced slots 49 arranged in a row longitudinally of the mold insert 50. Its top 51 is removed by a tear-away action in the same manner as shown in FIG. 11D.

FIG. 17 illustrates a further modification of the mold inserts shown in FIGS. 1–16 wherein its teardrop configuration 52 is provided with a flat bottom 53 so that it can rest flat on the ground or concrete slab and form a flat bottom cavity 54 in the mold configuration.

FIG. 18 illustrates a still further modification of the mold inserts shown in FIGS. 1–17 wherein the flangeless mold insert 55 fits into a rack 56 for holding the insert upright during a concrete pouring operation. As shown, the rack 56 comprises a flat base 57 which is fastened by bolts or nails 58 to a concrete slab 59 and has a pair of longitudinally extending form fitting arms 60 for arcuately engaging a portion of the outer periphery of the base 61 of mold insert 55 in the manner shown. The cap or top 62 of this mold insert is torn away in the same manner, as heretofore explained, along the slotted configuration 28.

FIG. 19 illustrates a still further modification of the mold inserts shown in FIGS. 1–18 wherein the mold insert 63 which may have any design configuration but is shown herein as having a teardrop shape is held on top of the ground or slab 64 by a stake 65 driven through a suitable aperture in its top 66 and vertically through its base or bottom base 67 of its flume configuration into the ground or slab 64.

Figure 20:
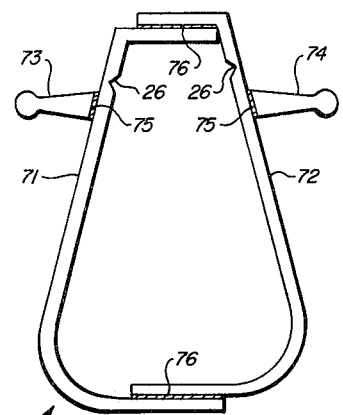
FIG. 20 is an end view of a mold insert formed by two similar interfitting parts.

FIG. 20 illustrates an end view of a further structure for forming a mold similar to those shown in FIGS. 1–19 and for the same purpose. FIG. 20 discloses a mold 70 formed from similar or identical U-shaped portions 71 and 72 with the legs of this portion overlapping in the manner shown. These resilient U-shaped portions are so shaped that when in interlocking arrangement they form a teardrop configuration similar to that disclosed in FIGS. 1–19 except that the flanges 73 and 74 are suitably secured such as by gluing with material 75 to like or different points along the outside and inside periphery of the portions. If desired, both legs of one portion may overlap the outside periphery of the free end of the legs of the other portion.

In order to secure the two portions together the juxtapositioned ends of the U-shaped portions 71 and 72 may be secured together by suitable gluing material 76. In a manner similar to the previously disclosed mold configurations, the U-shaped portions may be provided with tear-away zones 26 for removing the top of the mold after concrete has been set therearound as heretofore explained.

Figure 21:
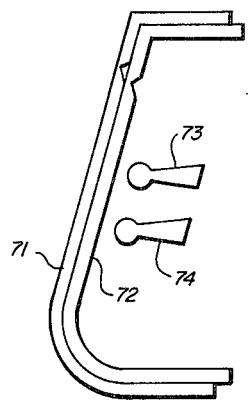
FIG. 21 is an end view showing the parts of FIG. 20 in a nested shipping position.

FIG. 21 illustrates a nesting arrangement of the parts of mold 70 shown in FIG. 20 for shipping purposes.

Figure 22:
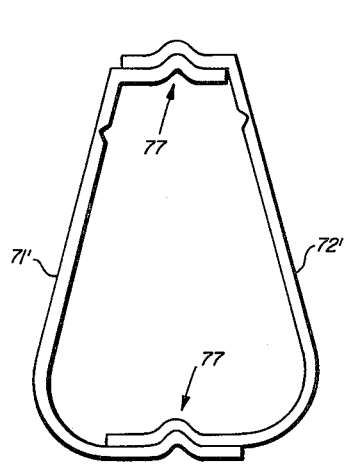
FIG. 22 is a view similar to the view shown in FIG. 20 with the parts interlocking in a mechanical mode.

FIG. 22 illustrates a modification of the mold 70 shown in FIG. 20 wherein the free ends of the legs of the mold portions 71' and 72' are provided with interlocking means 77 for holding the mold portions together without the need of the gluing material 76 used in FIG. 20.

Figure 23:
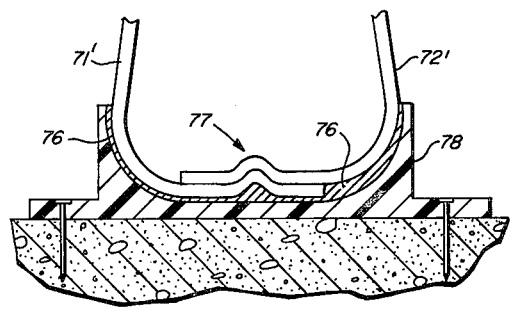
FIG. 23 is a view of the structure shown in FIG. 22 mounted in a bracket.

FIG. 23 illustrates the mold configuration of FIG. 22 positioned in a stand or bracket 78 which is surrounded by the concrete when it sets.

Although the mold inserts have been shown with tear-away portions, the tear-away portion or part thereof may be cut away and still fall within the scope of the invention.

The cross-sectional teardrop style flume 21 shown in FIGS. 1–23 is satisfactory for waste handling for cattle in feedlots and confinement buildings, although any type of flume and elongated narrow neck cross-sectional configuration may be utilized and fall within the scope of this invention. FIGS. 3–5, for example, illustrate a modification of the flume configuration shown in FIGS. 1 and 2 wherein the flumes formed by these mold inserts have a narrower opening 27 than the opening of the flume formed by mold insert 20 of FIGS. 1 and 2.

It should be noted that one or more spacedly positioned longitudinally arranged flumes may be formed in concrete slabs for forming a slotted floor for animal confinement pens and buildings which form a part of its waste removable system.

Although but a few embodiments of the present invention have been illustrated and described, it will be apparent to those skilled in the art that various changes and modifications may be made therein without departing from the spirit of the invention or from the scope of the appended claims.

What is claimed is:

1. A panel for forming at least a part of a platform for confinement pens for livestock comprising:
   a ground supported concrete member having a top surface, two sides, two ends and a bottom portion and at least one integrally formed flume forming a passageway therein longitudinally thereof,
   said flume opening outwardly of the top surface of said panel along at least a part of its length for receiving therein animal excreta, the width of said flume opening being substantially narrower than the width of said passageway in said flume, one end of said flume opening outwardly of one end of said member and forming a discharge port for liquid moving through said flume forming a carrier for the excreta, and a flexible lining forming a part of said flume, said lining surrounding only the inner periphery thereof below said flume opening terminating below the flume opening with lateral extending flange means at its upper portion extending into the concrete member and held in place by a plurality of stakes engaging the flange means and embedded in the concrete member.

2. The panel set forth in claim 1 wherein:

a plurality of integrally formed flumes are formed in said member.

3. The panel set forth in claim 1 wherein:

said flange means comprises a pair of flanges spacedly arranged around the outer periphery of said lining to extend laterally therefrom for locking said lining to the concrete forming said member.

4. The panel set forth in claim 3 wherein:

said flanges extend longitudinally of said member and substantially its full length.

* * * * *